United States Patent [19]

Clapper

[11] 4,259,310
[45] Mar. 31, 1981

[54] PROCESS FOR THE MANUFACTURE OF TITANIUM DISULFIDE

[75] Inventor: Thomas W. Clapper, Oklahoma City, Okla.

[73] Assignee: Kerr-McGee Chemical Corporation, Oklahoma City, Okla.

[21] Appl. No.: 115,993

[22] Filed: Jan. 28, 1980

[51] Int. Cl.³ .............................................. C01B 17/00
[52] U.S. Cl. .................................. 423/561 R; 423/565
[58] Field of Search ................... 423/561 R, 562, 565

[56] References Cited

U.S. PATENT DOCUMENTS

| 3,963,443 | 6/1976 | Bond et al. | 423/574 R |
| 4,137,297 | 1/1979 | Thorp et al. | 423/561 R |

FOREIGN PATENT DOCUMENTS

| 1224288 | 4/1965 | Fed. Rep. of Germany | 423/561 R |
| 1558050 | 1/1969 | France | 423/561 R |
| 878101 | 9/1961 | United Kingdom | 423/561 R |

Primary Examiner—Herbert T. Carter
Assistant Examiner—Gary P. Straub
Attorney, Agent, or Firm—William G. Addison

[57] ABSTRACT

A process for the manufacture of titanium disulfide by the vapor phase reaction of titanium tetrachloride and a sulfur containing gas. The titanium tetrachloride and the sulfur containing gas are preheated separately and the sulfur containing gas is introduced through a supply conduit at an established rate of flow into a reaction zone and the titanium tetrachloride is introduced into the reaction zone with a downstream component of velocity. A refractory material having a mean particle size greater than the titanium sulfide product is introduced into the product gas stream to impinge on the walls of the reaction zone to eliminate titanium disulfide deposition thereon.

16 Claims, 12 Drawing Figures

PROCESS FOR THE MANUFACTURE OF TITANIUM DISULFIDE

BACKGROUND OF THE INVENTION

1. Field of the Invention

This invention relates to a process for the manufacture of titanium disulfide by the vapor phase reaction of titanium tetrachloride and a sulfur containing gas.

2. Description of the Prior Art

Previously, titanium disulfide has been manufactured by reacting titanium metal with sulfur in a sealed container at red heat. British Pat. No. 878,101 discloses the reaction of titanium tetrachloride with hydrogen sulfide in the presence of water vapor to produce titanium disulfide. The reaction is achieved by introducing the reactants through concentrically arranged jets such that the reactants mix together on issuing from their respective jets. Alternatively, the reactants can be introduced into a bed of fluidized particles. The tendency of the titanium disulfide product to form hard deposits or crusts within the reactor constitutes a serious difficulty in both types of reactions. In the first instance, the deposits are on the walls of the reactor, especially in the region of the inlet jets. When a fluidized bed is used, the deposits are mainly in the form of a hard coating on the particles that make up the bed. These deposits can lead to blockage of the reactor.

French Pat. No. 1,558,050 discloses carrying out the reaction in a mechanically moved bed of titanium disulfide particles, such as a stirred bed reactor.

German Pat. No. 1,224,288 discloses the introduction of titanium tetrachloride and hydrogen sulfide into a fluid bed of titanium disulfide granules having an average particle size diameter of not less than 0.1 mm with a linear velocity sufficient to suspend the titanium disulfide granules.

The basic difficulty in these processes is the necessity to grind or otherwise mechanically powder the titanium disulfide granules produced to achieve a finely divided titanium disulfide product.

SUMMARY OF THE INVENTION

The present invention is based on the discovery that when using a vapor phase reaction to produce titanium disulfide, the deposition of product titanium disulfide on the walls of the reactor can be eliminated or at least substantially reduced by suitable control of the gas flow within the reaction zone and the addition of an inert particulate refractory to impinge on the walls of the reaction zone.

Broadly, this invention provides a process for the manufacture of titanium disulfide by reacting titanium tetrachloride with a vaporous sulfur containing gas comprising vaporous elemental sulfur or hydrogen sulfide gas. More specifically, it comprises separately preheating titanium tetrachloride and vaporous elemental sulfur or hydrogen sulfide to such a degree that if no reaction were to take place between them, the temperature of the gaseous mixture would be at least 400 degrees C.

The preheated vaporous sulfur containing gas is introduced into the open entrance of an enlongated reaction zone by passing it at a velocity of at least 50 feet per second through a supply conduit.

The supply conduit has a diameter at its downstream end no greater than the diameter of the entrance end of the reaction zone. The downstream end portion of the conduit is coaxial with the reaction zone and is substantially nondivergent in the direction of flow of the vaporous sulfur containing gas. The downstream end of said conduit is separated in an axial direction from the entrance end of the reaction zone to form a circumferentially extending inlet for the preheated titanium tetrachloride vapor.

The upstream and downstream faces of said inlet extend towards the axis of said conduit and reaction zone at an angle within the range of from 15° to 165° with respect to said axis. In those instances in which the faces are parallel and particularly where the faces extend towards the axis of the reaction zone at an angle greater than 80° with respect to said axis the supply conduit terminates in a tapered section.

In those instances in which the inlet faces converge it is desirable to have the supply conduit terminate in a tapered section.

In those instances in which the titanium tetrachloride vapor issues from the inlet in an upstream direction the supply conduit also terminates in a tapered section. Preferably the upstream face extends in a downstream direction towards the axis of the reaction zone at an angle within the range of from about 15° to 80° with respect to said axis. The downstream face extends towards said axis in such manner that the angle between it and the normal to the axis is always at least 10° less than the angle between the upstream face and the normal to the axis.

Particularly satisfactory results are obtained when the upstream face of the inlet extends in a downstream direction towards the axis of the reaction zone at an angle within the range of about 15° to 80° with respect to said axis and the downstream face of said inlet extends towards said axis at an angle within the range of from about 25° to 90° with respect to said axis. Preferably, the angle between the two faces is at least 15°.

Said faces define the inlet to the reaction zone for the titanium tetrachloride vapor. The vapor is passed through this inlet at a velocity of at least 50 feet per second. The rate of flow of vapor is maintained substantially constant along the circumferential extent of the inlet.

The reaction zone preferably has a frustoconical entrance portion tapering in an upstream direction at an angle of from 1° to 30° and a length equal to about one to 25 times its diameter at its entrance end. The reaction zone preferably is cooled to such an extent that the surface of the reaction zone is maintained at a temperature not exceeding 750 degrees C. As will be described more fully hereinafter, an inert particulate refractory material preferably is introduced into the supply conduit for the vaporous sulfur containing gas. Product titanium disulfide produced in the reaction zone then is cooled and separated and recovered from admixture with gases and any inert particulate material.

In practicing the invention, in accordance with one aspect thereof, the reactants are separately preheated in such manner that when they are combined in the reaction zone, the mixed gas temperature is within a range of from about 400 degrees C. to about 700 degrees C. and preferably within the range of from about 450 degrees C. to about 650 degrees C. The preheat temperatures required to produce a given mixed gas temperature depend in part on the quantities, temperature, and nature of the materials that are introduced into the reaction zone, as described more fully below.

The vaporous sulfur containing gas may be preheated directly or indirectly. If desired, direct heating can be accomplished by incorporating with it a hot inert gas such as argon. Alternatively, indirect heating can be accomplished by using heat exchangers.

The preheated vaporous sulfur containing gas is fed to a supply conduit for introduction into the reaction zone. The downstream end portion of that conduit may be cylindrical with a diameter equal to or slightly less than the diameter of the reaction zone at its upstream end. If desired, said downstream end portion may terminate in a short tapering (preferably, frustoconical) section, the taper being in a downstream direction. In this latter modification, the diameter of the downstream end of the tapering section should be equal to or slightly less than the diameter of the upstream end of the reaction zone; the remainder or upstream portion of the conduit may be cylindrical and may have a diameter greater than that of the entrance of the reaction zone.

The length of said portion of the supply conduit should have a length equal to at least five times, and preferably at least 10 times, its diameter at its exit end. The preheated vaporous sulfur containing gas preferably is introduced into the conduit by first feeding it to an annular distributing chamber surrounding and communicating with a circumferentially extending opening formed in the wall of the conduit.

The vaporous sulfur containing gas should be introduced in such manner that it leaves the conduit at a velocity of at least 50 feet per second and preferably at least 125 feet per second.

Preferably, the titanium tetrachloride should leave the mouth of the inlet to the reaction zone at a velocity of at least 50 feet per second. The said velocity may be determined readily from a determination of the volume of titanium tetrachloride flowing through the inlet in unit time and the dimensions of the inlet.

A distributing chamber, to which the preheated titanium tetrachloride is fed, is provided to surround the said inlet. The chamber assists in achieving the required uniformity, along the length of the inlet, of the rate of flow of titanium tetrachloride through the inlet by providing a flow path of relatively large cross-sectional area long the length of, but outside, the inlet. Additionally, this chamber can be provided with a distribution device comprising a series of longitudinal baffles located in a plane normal to the plane of the entrance to the annular distribution chamber to further assist in developing the required uniformity in the flow rate of the titanium tetrachloride. The other requirement for achieving the said required uniformity is a sufficient pressure drop across the inlet itself. The inlet should be of uniform width. The distributing chamber should provide a flow path of sufficiently large cross-sectional area to give only a small pressure drop along the said flow path. The flow pattern within the supply conduit for the oxidizing gas and the reaction chamber in the region of the inlet should be such that the pressure is substantially uniform around the circumference of the reaction chamber. The pressure drop across the inlet should be equivalent to from about 5 to about 100 inches of water, and preferably from about 15 to about 75 inches of water.

The reaction zone or chamber preferably is tubular in form, having an entrance portion, that is, at least that portion which is immediately adjacent to said titanium tetrachloride inlet, preferably frustoconical, tapering in an upstream direction. The angle of the cone thus defined lies within the range of from 1° to 30° and preferably within the range of the reaction zone at its upstream or entrance end.

It is believed that the frustoconical portion of the reaction zone causes the flowing gases to separate from the surface of the reaction zone with consequent backmixing of the reactants.

The reason or technical explanation as to why the process of the present invention avoids or substantially reduces the buildup of hard deposits of the walls of the reactor and associated equipment is not fully understood at the present time. Without restricting the invention to any particular theories, it is believed that the following factors contribute to the success of the invention:

1. Passing the vaporous sulfur containing gas through the supply conduit at velocity of at least 50 feet per second tends to prevent titanium tetrachloride or titanium disulfide product from diffusing or otherwise passing upstream and depositing in or on that conduit.

2. The established flow of the vaporous sulfur containing gas insures that there are no stagnant regions in which buildup of titanium disulfide deposits could occur. The term "Established Flow" as used herein will be understood to mean that kind of flow in which the profiles of the time average of the gas velocity over all cross-sections of the flow path, perpendicular to the axis of the flow path, are substantially identical and in which the time average of the velocity nowhere has a component parallel to the axis of the conduit in the upstream direction.

3. When the faces of the titanium tetrachloride inlet cause the titanium tetrachloride vapor to enter the reaction zone with a component of velocity which is parallel to the axis of the reaction zone and in a direction downstream thereof, this helps to prevent titanium tetrachloride vapor from entering the supply conduit for the vaporous sulfur containing gas and reacting therein.

4. Any downstream component of velocity of the titanium tetrachloride vapor leads to a reduction, for a given velocity through its inlet, of the component of velocity transverse to the axis of the reaction zone and, in turn, reduces the tendency of the titanium tetrachloride stream to constrict the stream of vaporous sulfur containing gas. As a result, a relatively high gas velocity is achieved over substantially the whole of the cross-section of the reaction zone from a thin boundary layer. This is to be contrasted with prior proposals for confining the reactant gas stream in a region away from the surface of the reaction zone.

5. In those instances in which the circumferential inlet for the titanium tetrachloride converges towards the axis of the reaction zone, eddies are prevented from forming within that inlet and the possibility of the vaporous sulfur containing gas entering the same is lessened.

6. The flow velocity of the titanium tetrachloride vapor at the mouth of its inlet is such as to further reduce the possibility of the vaporous sulfur containing gas entering that inlet.

7. Maintenance of a substantially constant rate of flow of the titanium tetrachloride vapor along the complete circumferential extent of its inlet avoids the possibility that it might deflect the stream of vaporous sulfur containing gas towards one side of the reaction zone, with a consequent reduction in gas velocity on the other side of the zone.

8. Introduction of an inert particulate refractory with a mean particle diameter greater than the particle diameter of the titanium disulfide product to impinge upon the walls of the reaction zone to reduce the buildup of hard deposits thereon.

To provide additional heat in the region where the vaporous reactants meet, in addition to that imparted to the reactants in their separate preheaters and to provide more accurate and flexible control of the mixed gas temperature, an inert gas as previously described can be introduced into the reaction zone or into the downstream end portion of the supply conduit for the vaporous sulfur containing gas. Such inert gas preferably is introduced at such a rate as to raise the mixed gas temperature by an amount within the range of from about 5 degrees C. to about 200 degrees C.

The apparatus of the present invention including the walls of the reaction zone, the supply conduit for the vaporous sulfur containing gas and the means for supplying the titanium tetrachloride to the inlet for that reactant, may be constructed of the same of different materials. Broadly, the choice lies between corrosion-resistant metals, for example, stainless steels or nickel alloys on the one hand and nonmetallic refractory materials, for example, quartz fused silica, alumina or the like on the other hand.

As indicated hereinabove, inert particulate refractory material, of larger mean particle size than the titanium disulfide product being produced, preferably is introduced in such manner as to impinge upon those surfaces of the reaction zone and the vaporous sulfur containing gas supply conduit that are adjacent to the titanium tetrachloride inlet to prevent or substantially reduce any tendency for the deposition of titanium disulfide on said surfaces. Said material preferably is introduced, in a preheated condition and in suspension in a suitable inert carrier gas, into the supply conduit for the vaporous sulfur containing gas. The refractory material is substantially completely carried out of the reaction zone and thereafter is separated from the product titanium disulfide.

Preferably, the inert particulate refractory material, together with its carrier gas is introduced into the supply conduit for the vaporous sulfur containing gas through a nozzle mounted coaxially within said conduit, and exiting in the downstream direction. The nozzle may be constructed from suitable corrosion-resistant metals including, for example, Inconel or Nihard, or from a suitable corrosion-resistant and wear-resistant nonmetallic material such as alumina.

When it is desired to introduce both an inert refractory material and additional heat as described hereinabove, the refractory material can be introduced through a nozzle situated coaxially within the exit end of the supply conduit for the vaporous sulfur containing gas and the heated inert gas can be introduced through tubes mounted parallel with and in close proximity to that nozzle. Such tubes should terminate short of the exit or downstream end of said nozzle. If, as will be described hereinbelow, deflecting means is provided within said supply conduit, the heated inert gas can be supplied through a tube mounted coaxially within said deflecting means.

The inert particulate refractory material may be introduced through nozzles of varying configurations. Thus, the nozzle may be convergent in a downstream direction. Preferably, however, it is in the form of a venturi in which the nozzle is provided with a coaxial, conical member situated a short distance downstream of the mouth of the venturi, the apex of the cone pointing in the upstream direction. The conical member serves to deflect the gaseous suspension outwardly and, preferably, is so mounted as to enable its position to be adjusted in an axial direction to enable the extent of the said deflection to be varied.

Instead of introducing the inert particulate refractory material through a nozzle situated coaxially within the supply conduit for the vaporous sulfur containing gas, such material may be introduced into the supply conduit at or towards the upstream end thereof or it may be introduced into the preheated vaporous sulfur containing gas before that gas enters the supply conduit. Moreover, deflecting means may be provided within the vaporous sulfur containing gas supply conduit and arranged in such manner as to deflect the gaseous suspension of particulate material towards the surface of the said supply conduit. Such deflecting means may comprise a rifled or helically vaned member mounted coaxially within the said supply conduit. Alternatively, it may comprise a coaxially mounted member whose diameter first increases and then decreases in a downstream direction whereby the region between such member and the surface of the supply conduit forms what can be regarded as an annular venturi. It will be understood, of course, that one or more nozzles may be used, as desired.

The inert particulate refractory material must be a hard solid that is not attacked to any appreciable degree by chlorine at the temperatures and under the other conditions that occur during the titanium disulfide-forming reaction. The material may comprise zircon particles, silica particles, alumina particles, titanium disulfide particles or the like. Preferably, the material is silica sand. The material may also be a mixture of two or more of these materials. The particles should not be so small as to pass through an 85 mesh screen (B.S.S.). The practical upper limit of the particle size is determined in general by the requirement that the particulate refractory material shall be carried out of the reaction chamber by the gas stream. Preferably, substantially all the particles should have a size within the range of from $-10$ to $+40$ mesh (B.S.S.).

The optimum rate or introduction of the inert particulate refractory material depends upon the design and dimensions of the reactor and may be varied during the operation of the process. If the rate of introduction is high, the quantity of the material to be separated from the product titanium disulfide will be correspondingly large. If the material is introduced into the reaction chamber at too low a temperature, undue cooling of the reactants will occur with consequent incomplete reaction. Therefore, it is desirable that the particulate material be preheated to an elevated temperature prior to its introduction into the vaporous sulfur containing gas supply conduit.

The inert particulate refractory material should be introduced into the supply conduit for the vaporous sulfur containing gas at a velocity of at least about 20 feet per second, preferably at a velocity of about 50–100 feet per second. The upper limit for the velocity of introduction of the inert particulate refractory material is determined by the requirement that it should not be so high as to cause undue wear of the reactor surface or surfaces. Generally, to avoid undue wear of such surfaces as well as the internal surface of the nozzle through which it may be introduced, the velocity of introduction should not exceed about 175 feet per second, and preferably should not exceed 120 feet per second.

The inert carrier gas in which the refractory material is suspended may be a gas that is inert to the reactants under the conditions of the reaction, and may include, for example, chlorine, nitrogen or the like.

The concentration of the particulate refractory material in its carrier gas should be high, for example, about 0.1 to 1.0 pound of material per cubic foot of gas, measured at the pressure of introduction of the gas into the reaction zone.

Product titanium disulfide may be separated from the inert particulate refractory material by means of settling chambers. However, cyclones may be used either instead of or in conjunction with such settling chambers. After the refractory material has been separated from the product titanium disulfide, it preferably is cooled and thereafter recycled to the reactor.

It is important that the design of the apparatus, the temperatures and the reactant flow rates be such that the reactants and the products of the reaction remain within the reaction zone for a period of time sufficient to insure substantially complete reaction, but not so long as to cause undesirable particle growth of the product sulfide. Usually, a retention time within the range of from about 0.02 to about 10 seconds is satisfactory.

After the gaseous products, with the product titanium disulfide in suspension therein leave the reaction zone they preferably are cooled rapidly to reduce their temperature to below about 500 degrees C., preferably below about 350 degrees C. Such cooling may take place at a time within the range of from about 0.01 to about 10 seconds, preferably about 0.05 to about 5 seconds after the titanium tetrachloride is introduced into the reaction zone. The cooling may be effected by mixing cooled product gas, for example, chlorine, with the product gas stream containing the product sulfide in suspension.

The separation of product titanium disulfide from the inert particulate refractory material and the cooling of the reaction products may be carried out in a single operation in accordance with the procedure disclosed in U.S. Pat. No. 3,341,014 issued to Maurice A. Claridge, et al.

As hereinbefore mentioned, the vaporous sulfur containing gas comprises vaporous elemental sulfur or hydrogen sulfide gas. The proportion of vaporous sulfur containing gas introduced into the reaction zone along with the titanium tetrachloride should be such that the amount of sulfur present is sufficient for stoichiometric reaction with the titanium tetrachloride and preferably slightly in excess thereof.

In addition, particularly satisfactory results are obtained if there is introduced into the reaction zone a quantity of water vapor within the range of from 0.00005 to 0.025 parts per part of titanium tetrachloride vapor introduced into the reaction zone (the parts being by weight). The water vapor can be introduced into the reaction zone in admixture with the vaporous sulfur containing gas. Alternatively, the water vapor can be introduced in admixture with the inert gas in which the inert particulate refractory is suspended.

For a more complete understanding of the present invention, reference is made to the following description thereof taken in conjunction with the accompanying drawings.

DESCRIPTION OF THE PREFERRED EMBODIMENT

Figure 1:
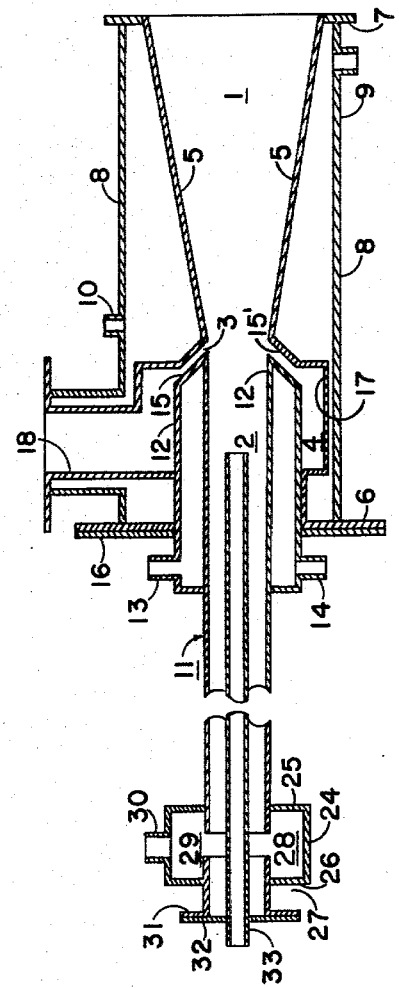
FIG. 1 is a cross-sectional view taken through one form of suitable apparatus.

Referring to FIG. 1 of the accompanying drawing, the apparatus comprises a frustoconical reaction zone 1 and a cylindrical supply conduit 2 for the preheated vaporous sulfur containing gas. The conduit 2 is coaxial with the reaction zone 1 and is arranged to supply vaporous sulfur containing gas to the open end of the reaction zone 1.

The downstream end of the supply conduit 2 is spaced from the upstream end of the reaction zone 1 to form a circumferentially extending inlet 3, which provides communication between the reaction zone 1 and an annular distribution chamber 4, and which serves as an inlet for the preheated titanium tetrachloride vapor.

The portion of the reaction zone 1 immediately downstream of the inlet 3 is bounded by a frustoconical tubular member 5. A cooling jacket 8 surrounds the distributing chamber 4 and the member 5, and it is secured at its upstream end to flange 6 and at its downstream end to a flange 7. An inlet pipe 9 allows cooling water to be supplied to the cooling jacket 8 close to the downstream end thereof and an outlet pipe 10 allows water to be withdrawn from the cooling jacket 8.

The supply conduit 2 is formed by a cylindrical tubular member, which is indicated generally by the reference numeral 11. The downstream end portion 12 of the member 11 has a double wall to permit liquid cooling of the portion 12, inlet and outlet pipes 13 and 14 for the liquid coolant being provided close to the upstream end of the portion 12. The downstream end face 15 of the member 11, which forms the upstream face of the inlet 3, is inclined in a downstream direction towards the axis of the reaction zone 1. Downstream face 15' which is integral with member 5 also is inclined in a downstream direction towards the axis of the reaction zone 1.

A short distance downstream of the inlet and outlet pipes 13 and 14, the member 12 is formed with an outwardly extending annular flange 16. The flanges 6 and 16 being secured together by bolts, not shown. Tubular member 17 which is coaxial with tubular member 11 and is integral with face 15' of inlet 3 has an upstream end portion of reduced diameter to provide a close fit over the portion 12 of the member 11. The upstream end of the member 17 is secured to the flange 6. Thus, in addition to forming the outer wall of the annular distributing chamber 4, the member 17 serves to locate the tubular member 5 with respect to the tubular member 11.

The member 17 and the cooling jacket 8 are each formed with a cylindrical extension which form a conduit 18 to enable preheated titanium tetrachloride vapor to be supplied to the annular distributing chamber 4.

The upstream end portion of the member 11 is surrounded by a tubular cylindrical member 24, which is coaxial with the member 11 and which is formed at its downstream end with an inwardly extending annular flange 25 and at its upstream end with an inwardly extending annular flange 26. At its inner edge, the flange 25 is secured to the member 11. The downstream end of the member 27 is spaced from the upstream end of the member 11 to form a circumferentially extending slot 28. The slot 28 provides communication between an annular distributing chamber 29, which is bounded by the members 11 and 24 and the flanges 25 and 26. The member 24 is formed with a cylindrical extension 30 which serves as an inlet for the preheated oxidizing gas.

At its upstream end, the tubular member 27 is formed with an outwardly extending annular flange 31 which is secured by bolts (not shown) to a circular plate 32 that is coaxial with the tubular member 11.

The plate 32 is formed with a circular aperture which is coaxial with the member 11 and through which there passes a tube 33. The tube 33 extends coaxially with the member 11 and terminates a short distance upstream of the inlet 3 to enable an inert particulate refractory material to be introduced into the reactor.

The angle of the imaginary cone on which the internal surface of the frustoconical member 5 lies may be 10°30'. The apparatus may be constructed of a nickel alloy, for example, Inconel.

In operation, the preheated vaporous sulfur containing gas is supplied to the inlet 30, whence it passes through the annular distributing chamber 29 and the slot 28 into the supply conduit 2 for the vaporous sulfur containing gas. During the course of its passage down the supply conduit 2, any gross irregularities in the flow pattern of the vaporous sulfur containing gas disappear and established flow (as hereinbefore defined) is attained before the vaporous sulfur containing gas reaches the inlet 3.

The preheated titanium tetrachloride vapor is supplied to the conduit 18, whence it passes through the annular distributing zone 4 and inlet 3 to enter the reaction zone 1, where it mixes and reacts with the preheated vaporous sulfur containing gas to form finely divided titanium disulfide. The frustoconical form of the portion of the reaction zone 1 that is immediately downstream of the inlet 3 improves the mixing of the reactants and causes a proportion of the reaction products to be recycled to the vicinity of the inlet 3.

Preheated inert particulate refractory material, for example, silica sand, suspended in an inert carrier gas, for example, is supplied to the tube 33, the carrier gas being under pressure. This results in a spray of the particulate material issuing from the end of the tube 33 and impinging on the surfaces of the reaction zone 1 and the supply conduit 2 adjacent to the inlet 3. In addition to tending to prevent the buildup of titanium disulfide deposits in the region of the inlet 3, it is believed that the particulate material may assist in the reaction by reason of the dislodging of titanium disulfide particles, by the inert material, whereby they may serve as seeds.

The circulation of a suitable coolant liquid, for example, water through the cooling jackets serves to prevent corrosion of the metal surfaces that are exposed to the reactants or reaction products.

After leaving the reaction chamber 1, the product gas stream is cooled and product titanium disulfide is brought out of suspension and separated from the inert particulate material.

Figure 2:
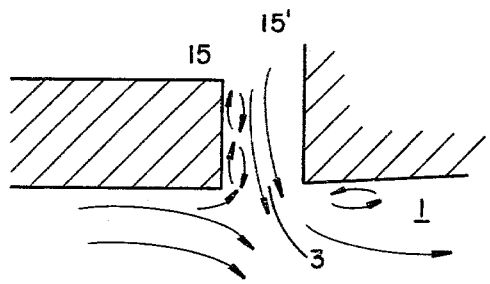
FIGS. 2 and 3 are schematic cross-sectional views taken through a part of the reactor on a larger scale, showing the effect on the flow pattern of varying the configuration of the titanium tetrachloride inlet.
Figure 3:
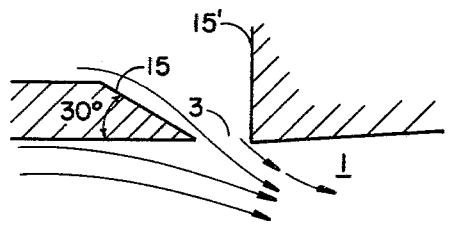

The effect of the inclination of the upstream face 15 of the inlet 3 (while keeping the downstream face 15' at an angle of 90° with respect to the axis of the reaction zone) on the gas flow pattern is shown qualitatively in FIGS. 2 and 3 of the drawings. FIG. 2 shows how, when the upstream face 15 of the inlet 3 extends in a direction towards and at an angle of 90° with respect to the axis of the reaction chamber 1, eddies are liable to form within the inlet 3 and vaporous sulfur containing gas is liable to enter the inlet with a consequent risk of titanium disulfide being deposited on the faces thereof. There is also a tendency for eddies to form in the reaction zone 1 immediately downstream of the inlet 3 and such eddies increase the tendency for titanium disulfide to be deposited on the surface of that portion of the reaction zone 1.

In FIG. 3, on the other hand, it can be seen how, when the upstream face 15 of the inlet 3 is inclined at an angle of 30° with respect to the axis of the reaction zone 1, the flow separation that causes the eddies to form when the upstream face of the inlet is not so inclined, is avoided.

Figure 4:
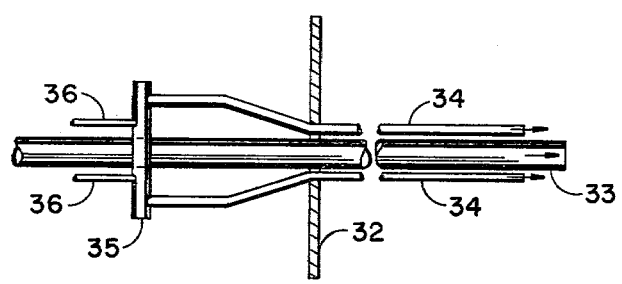
FIG. 4 is a cross-sectional view taken through a part of the form of apparatus shown in FIG. 1 modified by the addition of means for introducing an inert heating gas.

The form of apparatus shown in FIG. 1 of the drawings may be modified, as shown in FIG. 4, to enable an inert heating gas to be introduced into the supply conduit 2 for the vaporous sulfur containing gas. The modification includes the addition of two or more tubes 34, the downstream end portions of which extend parallel with and close to the tube 33 and terminate a short distance upstream of the downstream end of the tube 33.

The tubes 34 pass through apertures in a plate 32 and, upstream of the plate, diverge from one another and from the tube 33 to communicate with a manifold 35 to which an inert heated gas such as nitrogen can be fed through supply pipes 36.

The manner of operation of this modified form of apparatus is the same as that of the unmodified form except that the introduction of nitrogen into the supply conduit for the vaporous sulfur containing gas causes additional heat to be released just before the vaporous sulfur containing gas meets the titanium tetrachloride vapor. This raises the mixed gas temperature and, as is explained herein, permits more accurate control and more rapid variation of the mixed gas temperature.

Figure 5:
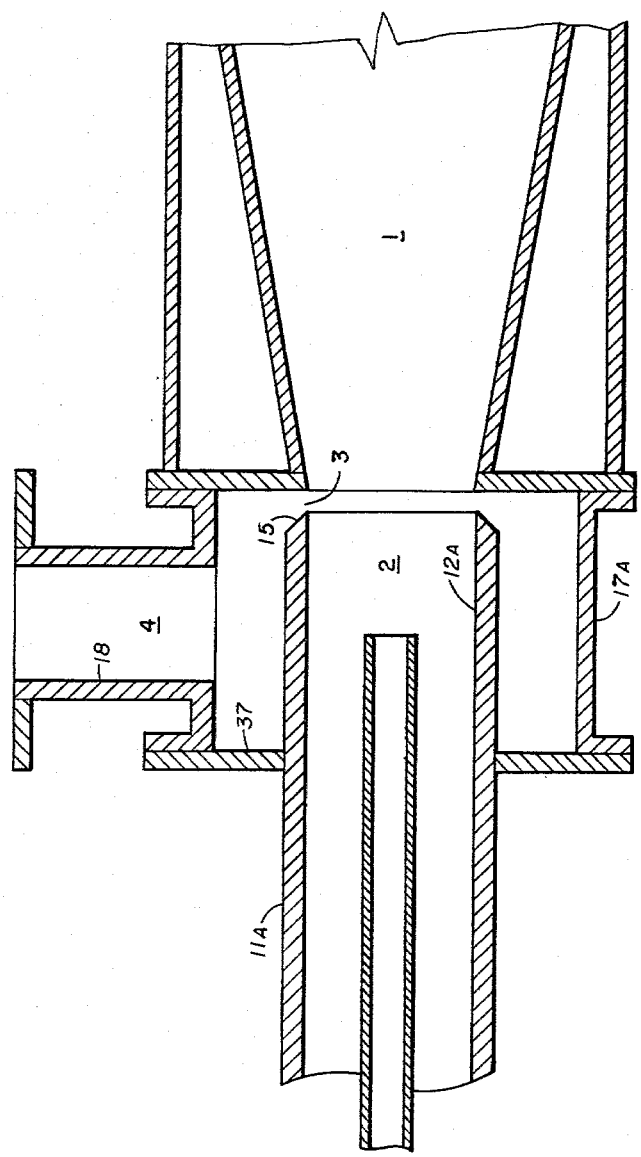
FIG. 5 is a cross-sectional view through a part of a second form of the apparatus.

Referring to FIG. 5 of the drawing, the form of apparatus there shown is similar to that shown in FIG. 1 except that means is not provided for cooling the downstream portion 12 of the tubular member 11 nor for cooling the greater part of the surface of the annular distributing chamber 4 and the surface of the conduit 18. Rather, a platinum lining is provided for uncooled surfaces that are exposed to the preheated titanium tetrachloride vapor.

Thus, the downstream portion 12 of the member 11 is replaced by a portion 12a having only a single wall. The upstream face 15 of the passageway 3, the surface of the annular distributing chamber 4, except for the downstream end surface (which is cooled by the coolant that cools the surface of the reaction chamber 1) and the surface of the conduit 18 are provided with a platinum cladding 37. Also, the cylindrical member 17 (see FIG. 1) is replaced by a cylindrical member 17a which is of the same diameter throughout its length.

The manner of operation of this second form of apparatus is the same as that of the first form except that the reactants are subjected to a lesser degree of cooling which means that a given mixed gas temperature is achieved with lower preheat temperatures.

Figure 6:
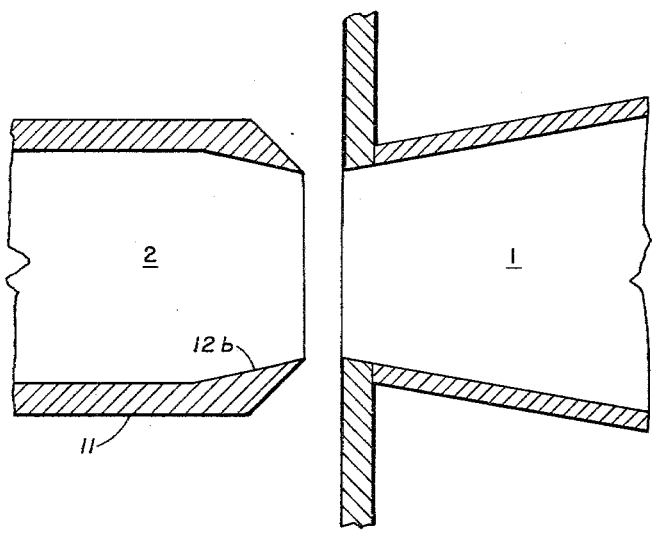
FIG. 6 is a cross-sectional view taken through the downstream end portion of a modified form of supply conduit for the vaporous sulfur containing gas suitable for use in the forms of apparatus shown in FIGS. 1 and 5.

As shown in FIG. 6 of the drawing, the form of apparatus shown in FIG. 1 (whether or not modified in the manner shown in FIG. 5) can be provided with a tubular member 11 having a modified downstream portion 12b of which the end part tapers in a downstream direction. The resulting constriction in the supply conduit 2 for the vaporous sulfur containing gas tends to increase the gas velocity near the terminus of the supply conduit. The diameter of the supply conduit 2 at its downstream end may be slightly less than the diameter of the reaction chamber 1 at its upstream end. In the form of apparatus shown in FIG. 5, the shape of the downstream portion 12a of the tubular member 11a may be modified in a similar manner.

Figure 7:
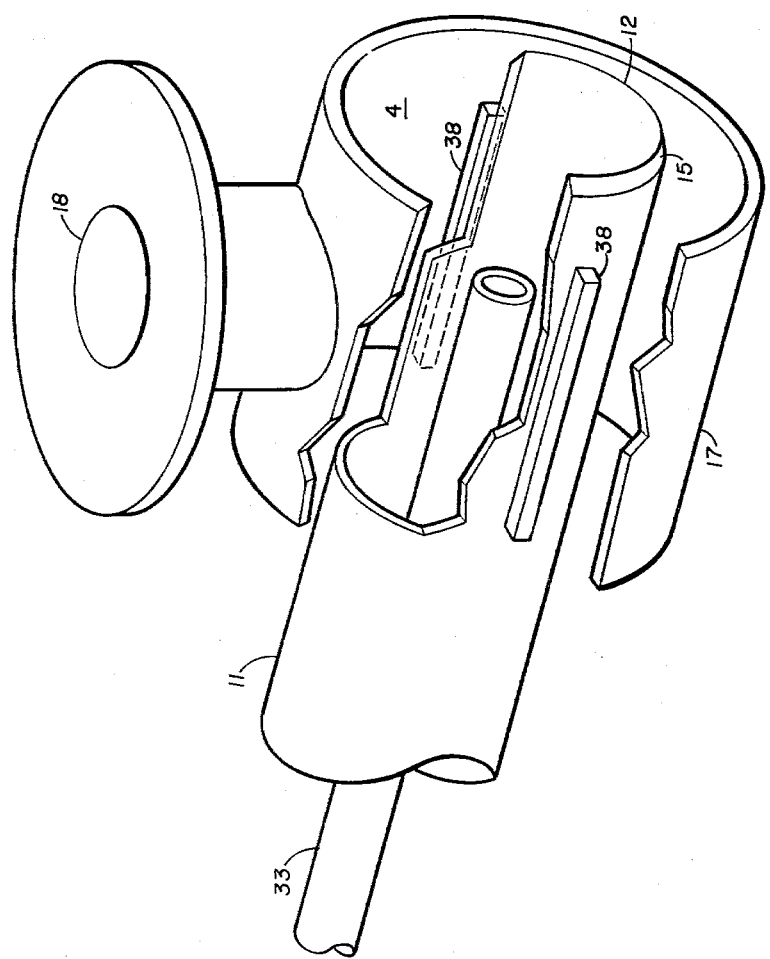
FIG. 7 is an isometric cutaway cross-sectional view of a portion of the titanium tetrachloride distribution chamber modified by the addition of a distributing device to aid in providing uniform titanium tetrachloride flow rates from the distribution chamber suitable for use in the forms of the apparatus shown in FIGS. 1 and 5.

As shown in FIG. 7 of the drawing, the form of apparatus there shown is similar to that shown in FIG. 1 or 5 except that means is provided to aid in the production of a uniform rate of flow of the titanium tetrachloride from the titanium tetrachloride annular distribution zone 4. A distributing device comprising a series of longitudinal baffles 38 is located in a plane normal to the plane of the entering titanium tetrachloride via conduit 18 in the annular distribution zone 4. More particularly, the baffles 38 are located on the annular portion of member 11 in such a manner that at least a portion of the vaporous tiitanium tetrachloride entering the annular distribution zone 4 via conduit 18 is caused to contact the baffles such that turbulent flow results to thereby provide a more even distribution of the vaporous titanium tetrachloride within the chamber prior to entry into the reaction zone 12 via inlet 3.

Figure 8:
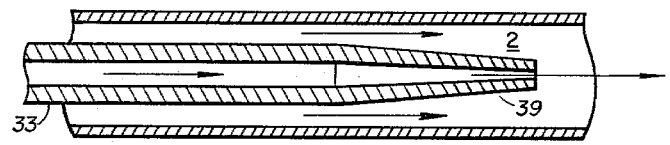
FIGS. 8 to 12 are cross-sectional views through modified nozzles and the like suitable for use in the forms of apparatus shown in FIGS. 1 and 5.
Figure 9:
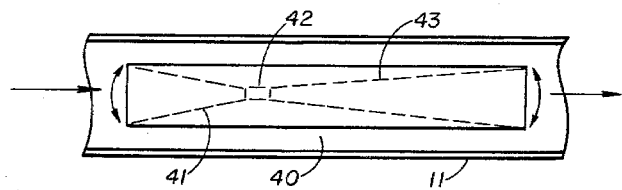

In the forms of apparatus shown in FIGS. 1 and 5, the downstream end portion of the tube 33 serves as a cylindrical nozzle for the gaseous suspension of the inert particulate material that is introduced through the tube 33. Other forms of nozzles may, however, be used instead. Thus referring to FIG. 8, the downstream end portion of the tube 33 may be replaced by a convergent nozzle 39. Instead, as shown in FIG. 9, a venturi nozzle, indicated generally by reference numeral 40, may be use. It comprises an entrance cone 41, a throat 42 and an exit cone 43. The angle of the entrance cone 41 may vary within the range of from 20° to 30° and the angle of the exit cone 43 may vary within the range of from 7° to 12° . The length of the throat 42 may vary within the range of from one half to 10 times the diameter of the throat.

Figure 10:
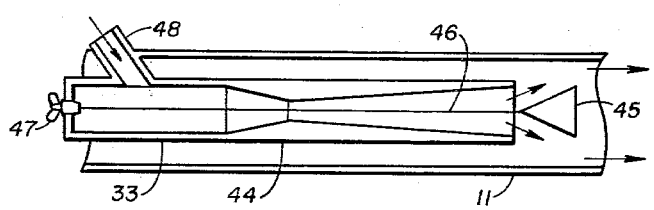

In the arrangement shown in FIG. 10, a venturi-type nozzle, indicated generally by the reference numeral 44, is provided with a pintle 45, which is a conical member mounted coaxially with nozzle 44 in such a manner that it tapers in an upstream direction. The apex of the pintle 45 is situated approximately in the plane of the downstream end of the nozzle 44, but the pintle 45 is located by a rod 46 which extends coaxially within the nozzle 44 and tube 33 to the upstream end of the tube 33 which, in this arrangement is closed, where there is provided adjusting means 47 to enable the position of the pintle 45 to be adjusted in an axial direction. Since the upstream end of the tube 33 is closed, there is provided a tube 48, which communicates with an inlet in the sidewall of the tube 43, to enable the particulate material and its carrier gas to be introduced in to the tube 33.

Another method of introducing the inert particulate refractory material is to dispense with the use of a nozzle mounted coaxially within the supply conduit for the vaporous sulfur containing gas and arranged to spray the particulate material directly onto the wall surfaces adjacent to the inlet 3, and, instead, introduce the particulate material into the supply conduit for the vaporous sulfur containing gas close to the upstream end of the conduit, for example, through two nozzles situated off the axis of the conduit, and then providing deflecting means in the downsteam portion of the said supply conduit. Two such arrangements are shown in FIGS. 11 and 12, respectively.

Figure 11:
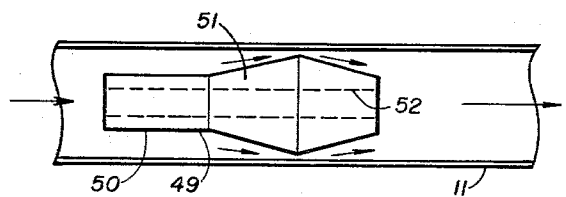

In the arrangement shown in FIG. 11, the deflecting means comprises a member which is indicated generally by the reference numeral 49. The upstream portion 50 of the member 49 is cylindrical, but the downstream end portion 51 of the member 49 first increases in diameter and then decreases in diameter in a downstream direction. Thus, the preheated vaporous sulfur containing gas, the inert particulate material and any carrier gas flowing within the member 11 is confined to an annular region which is adjacent to the inner surface of the member 11 and of which the width first decreases and then increases again to give an effect similar to that of a venturi. If desired, the member 49 may be formed with a central bore 52, which can serve either as an inlet for the inert gas or as a nozzle for the introduction of further particulate material.

Figure 12:
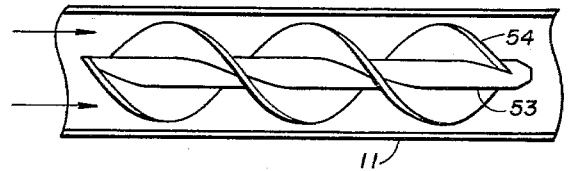

In the arrangement shown in FIG. 12, the deflecting means comprises a rod 53 mounted coaxially within the tubular member 11 and provided with helical vanes 54.

To illustrate the invention even more fully the following specific examples are set forth. Unless otherwise indicated all parts and percentages are by weight.

EXAMPLE 1

Titanium sulfide was produced by the vapor-phase reaction of titanium tetrachloride using apparatus as substantially shown in FIG. 1 of the drawing. The apparatus was constructed of a nickel alloy. The angle of the imaginary cone on which the inner surface of the frustoconical member lies, was 4°30". The length of the supply conduit 2 was ten times its diameter at its downstream end. The upstream and downstream faces of inlet 3 extended towards the axis of the reaction chamber 1 at angles of 75° and 90°, respectively, with respect to this axis. The separation, in an axial direction, of the downstream end of the tube 33 from the upstream face of the inlet 3 was such that silica sand issuing from said tube 33 impinged on the surfaces of the supply conduit 2 and reaction chamber 1 adjacent to inlet 3. The width of the mouth of the inlet 3 was 0.4 inch.

Liquid titanium tetrachloride was vaporized and the resulting titanium tetrachloride vapor was preheated in a fused silica preheater. The preheated vapor was supplied to the conduit 18 at a constant rate of 75 parts of titanium tetrachloride per hour, the velocity of the vapor over the area of the mouth of the inlet 3 being approximately 200 feet per second.

Sulfur was preheated in a nickel alloy tube preheater and fed to the inlet 30 at a constant rate of 26 parts vaporous sulfur per hour, water being metered to the vaporous sulfur stream, before it entered the preheater, by means of a positive displacement micro pump at a rate of 0.12 parts of water per hour.

Preheated vaporous sulfur under pressure was supplied to the tube 33 at a rate of 2 parts per hour. Preheated silica sand of mesh size −10 to +20 (B.S.S.) was introduced into the reactor through tube 33 at a rate of 7.5 parts per hour.

The velocity of the vaporous sulfur over the area of the downstream end of the supply conduit 2 was 185 feet per second.

The mixed gas temperature was about 500° C.

Cooling water was supplied to the cooling jackets to prevent corrosion thereof.

The titanium disulfide produced was separated from the gaseous reaction products and particulate material. A sample of titanium disulfide thus produced was examined and found to have an average particle size of about 5 microns.

EXAMPLE 2

Titanium sulfide was produced by the vapor-phase reaction of titanium tetrachloride using apparatus as substantially shown in FIG. 1 of the drawing. The apparatus was constructed of a nickel alloy. The angle of the imaginary cone on which the inner surface of the frustoconical member lies, was 4°30′′. The length of the supply conduit 2 was ten times its diameter at its downstream end. The upstream and downstream faces of inlet 3 extended towards the axis of the reaction chamber 1 at angles of 75° and 90°, respectively, with respect to this axis. The separation, in an axial direction, of the downstream end of the tube 33 from the upstream face of the inlet 3 was such that silica sand issuing from said tube 33 impinged on the surfaces of the supply conduit 2 and reaction chamber 1 adjacent to inlet 3. The width of the mouth of the inlet 3 was 0.4 inch.

Liquid titanium tetrachloride was vaporized and the resulting titanium tetrachloride vapor was preheated in a fused silica preheater. The preheated vapor was supplied to the conduit 18 at a constant rate of 75 parts of titanium tetrachloride per hour, the velocity of the vapor over the area of the mouth of the inlet 3 being approximately 200 feet per second.

Hydrogen sulfide was preheated in a nickel alloy tube preheater and fed to the inlet 30 at a constant rate of 29 parts vaporous hydrogen sulfide per hour, water being metered to the vaporous hydrogen sulfide stream, before it entered the preheater, by means of a positive displacement micro pump at a rate of 0.12 parts of water per hour.

Preheated vaporous hydrogen sulfide under pressure was supplied to the tube 33 at a rate of 2.1 parts per hour. Preheated silica sand of mesh size −10 to +20 (B.S.S.) was introduced into the reactor through tube 33 at a rate of 7.5 parts per hour.

The velocity of the vaporous hydrogen sulfide over the area of the downstream end of the supply conduit 2 was 185 feet per second.

The mixed gas temperature was about 500° C.

Cooling water was supplied to the cooling jackets to prevent corrosion thereof.

The titanium disulfide produced was separated from the gaseous reaction products and particulate material. A sample of titanium disulfide thus produced was examined and found to have an average particle size of about 5 microns.

While the invention has been described with respect to what at present are preferred embodiments thereof, it will be understood, of course, that certain changes, substitutions, modifications and the like may be made therein without departing from its true scope as defined in the appended claims.

What is claimed is:

1. In a process for the vapor-phase reaction of titanium tetrachloride with vaporous sulfur containing gas in an elongated titanium disulfide-forming reaction zone provided with an inlet for the introduction of preheated vaporous sulfur containing gas, an inlet for the introduction of preheated titanium tetrachloride, and an entrance portion, said inlet for the introduction of said vaporous sulfur containing gas comprising a supply conduit, the downstream end of which is spaced from the entrance portion of said reaction zone to define a circumferentially extending inlet which comprises said inlet for the preheated titanium tetrachloride, the improvements which comprise:

introducing said preheated titanium tetrachloride by passing said titanium tetrachloride with a downstream component of velocity into said reaction zone at a velocity of at least 50 feet per second through said titanium tetrachloride inlet which is provided with an upstream face extending towards the axis of said conduit and reaction zone at an angle within the range of from about 15° to 165° with respect to said axis from an upstream direction and a downstream face extending towards said axis at an angle within the range of about 15° to 165° with respect to said axis from a downstream direction, provided that when both of said upstream and downstream faces extend toward the axis of the reaction zone at an angle greater than 80° with respect to said axis the supply conduit for the vaporous sulfur containing gas terminates in a tapered section;

providing an established flow of said preheated vaporous sulfur containing gas in said supply conduit before said vaporous sulfur containing gas is introduced into said reaction zone by passing said gas, at a velocity of at least 50 feet per second, through a supply conduit having a diameter at its downstream end no greater than the diameter of the entrance portion of said reaction zone and the downstream end portion of said conduit over a length equal to at least five times the diameter of its downstream end having a straight axis, being coaxial with the reaction zone and being substantially non-divergent in the direction of flow of the vaporous sulfur containing gas;

reacting said titanium tetrachloride and said vaporous sulfur containing gas in said reaction zone to produce titanium disulfide;

directing inert particulate refractory material introduced through at least one nozzle upon the inside surface of both the reaction zone and the vaporous sulfur containing gas supply conduit that are adjacent to said inlet for the titanium tetrachloride to substantially reduce or prevent deposition of titanium disulfide on said inside surfaces; and recovering said titanium disulfide.

2. A process as defined in claim 1 in which said titanium tetrachloride is introduced into said reaction zone through an inlet in which said upstream face and said downstream face of said inlet for the titanium tetrachlodride extend towards said axis at the same angle and said supply conduit for the vaporous sulfur containing gas terminates in a tapered section.

3. A process as defined in claim 1 in which said titanium tetrachloride is introduced into said reaction zone through an inlet in which the downstream face of said inlet extends towards said axis at an angle within the range of from about 25° to 90° with respect to said axis.

4. A process as defined in claim 1 in which said titanium tetrachloride and vaporous sulfur containing gas are introduced into said reaction zone which has an entrance portion tapering in an upstream direction at an angle of from about 1° to 30° and a length equal to about one to 25 times its diameter at its entrance end.

5. A process as defined in claim 1 in which said titanim tetrachloride is introduced into a distributing chamber disposed about said inlet for the titanium tetrachloride.

6. A process as defined in claim 5 in which said titanium tetrachloride contacts a distributing device disposed within the distributing chamber to provide a uniform flow of titanium tetrachloride through said inlet.

7. A process as defined in claim 1 in which said vaporous sulfur containing gas is introduced into an annular distributing chamber disposed in operative communication with the supply conduit for the vaporous sulfur containing gas through a circumferentially extending opening.

8. A process as defined in claim 1 in which an inert heating gas is introduced into the downstream end portion of the supply conduit for the vaporous sulfur containing gas.

9. A process as defined in claim 1 in which the surface of the reaction zone downstream of said inlet for the titanium tetrachloride is cooled.

10. A process as defined in claim 1 in which the inert particulate refractory material is introduced through venturi nozzle means mounted coaxially within said supply conduit for said vaporous sulfur containing gas.

11. A process as defined in claim 1 in which the inert particulate material is introduced through a nozzle into the upstream end of said supply conduit for the vaporous sulfur containing gas and against a deflector located within said conduit and is deflected towards the inside surface of said conduit.

12. A process as defined in claim 1 in which said titanium tetrachloride and said vaporous sulfur containing gas are separately preheated to such a degree that when they are introduced into said reaction zone they have a mixed gas temperature of at least 400 degrees C.

13. A process as set forth in claim 1 in which there is introduced into the reaction zone a quantity of water vapor within the range of from about 0.00005 to 0.025 parts per part of titanium tetrachloride vapor introduced into the reaction zone.

14. In a process for the vapor-phase reaction of titanium tetrachloride with vaporous sulfur containing gas in an elongated titanium disulfide-forming reaction zone provided with an inlet for the introduction of preheated vaporous sulfur containing gas, an inlet for the introduction of preheated titanium tetrachloride, and an entrance portion, said inlet for the introduction of said vaporous sulfur containing gas comprising a supply conduit, the downstream end of which is spaced from the entrance of said reaction zone to define a circumferentially extending inlet which comprises said inlet for the preheated titanium tetrachloride, the improvements which comprise:

introducing said preheated titanium tetrachloride by passing said titanium tetrachloride with a downstream component of velocity into said reaction zone at a velocity of at least 50 feet per second through said titanium tetrachloride inlet which is provided with an upstream face which extends towards the axis of the reaction zone at an angle within the range of from about 15° to 165° with respect to said axis from an upstream direction and a downstream face extending towards said axis in a manner such that the faces converge with one another towards the axis of said reaction zone and the supply conduit for the vaporous sulfur containing gas terminates in a tapered section;

providing an established flow of said preheated vaporous sulfur containing gas in said supply conduit before said vaporous sulfur containing gas is introduced into said reaction zone by passing said gas, at a velocity of at least 50 feet per second, through a supply conduit having a diameter at its downstream end no greater than the diameter of the entrance portion of said reaction zone and the downstream end portion of said conduit over a length equal to at least five times the diameter of its downstream end having a straight axis, being coaxial with the reaction zone in the direction of flow of the vaporous sulfur containing gas;

reacting said titanium tetrachloride and said vaporous sulfur containing gas in said reaction zone to produce titanum disulfide;

directing inert particulate refractory material introduced through at least one nozzle upon the inside surfaces of both the reaction zone and the vaporous sulfur containing gas supply conduit that are adjacent to said inlet for the titanium to prevent deposition of titanium disulfide on said inside surfaces; and recovering said titanium disulfide.

15. In a process for the vapor-phase reaction of titanium tetrachloride with vaporous sulfur containing gas in an elongated titanium disulfide forming reaction zone provided with an inlet for the introduction of preheated vaporous sulfur containing gas, an inlet for the introduction of preheated titanium tetrachloride, and an entrance portion said inlet for the introduction of said vaporous sulfur containing gas comprising a supply conduit, the downstream end of which is spaced from the entrance portion of said reaction zone to define a circumferentially extending inlet which comprises said inlet for the preheated titanium tetrachloride, the improvements which comprise;

introducing said preheated titanium tetrachloride by passing said titanium tetrachloride with a downstream component of velocity into said reaction zone at a velocity of at least 50 feet per second through said titanium tetrachloride inlet which is provided with an upstream face extending in a downstream direction toward the axis of the reaction zone in such manner that the angle between it and the normal to the axis is at least 10° less that the angle between the downstream face and the normal to said axis;

providing an established flow of said preheated vaporous sulfur containing gas in said supply conduit before said vaporous sulfur containing gas is introduced into said reaction zone be passing said gas, at a velocity of at least 50 feet per second, through a supply conduit having a diameter at its downstream end no greater than the diameter of the entrance portion of said reaction zone and the downstream end portion of said conduit over a length equal to at least five times the diameter of its downstream end having a straight axis, being coaxial with the reaction zone and being substantially nondivergent in the direction of flow of the vaporous sulfur containing gas;

reacting said titanium tetrachloride and said vaporous sulfur containing gas in said reaction zone to produce titanium disulfide;

directing inert particulate refractory material introduced through at least one nozzle upon the inside surfaces of both the reaction zone and the vaporous sulfur containing gas supply conduit that are adjacent to said inlet for the titanium tetrachloride to substantially reduce or prevent deposition of titanium disulfide on said inside surfaces; and recovering said titanium disulfide.

16. In a process for the vapor-phase reaction of titanium tetrachloride with vaporous sulfur containing gas in an elongated titanium disulfide-forming reaction zone provided with an inlet for the introduction of preheated vaporous sulfur containing gas, an inlet means for the introduction of preheated titanium tetrachloride, and an entrance portion, said inlet for the introduction of said vaporous sulfur containing gas comprising a supply conduit, the downstream end of which is spaced from the entrance portion of said reaction zone to define a circumferentially extending inlet which comprises said inlet for the preheated titanium tetrachloride, the improvements which comprise:

introducing said preheated titanium tetrachloride by passing said titanium tetrachloride with a downstream component of velocity into said reaction zone at a velocity of at least 50 feed per second through said titanium tetrachloride inlet which is provided with an upstream face extending towards the axis of said conduit and reaction zone at an angle within the range of from about 15° to 165° with respect to said axis from an upstream direction and a downstream face extending towards said axis at an angle within the range of about 15° to 165° with respect to said axis from a downstream direction, provided that when both of said upstream and downstream faces extend toward the axis of the reaction zone at an angle greater than 80° with respect to said axis the supply conduit for the vaporous sulfur containing gas terminates in a tapered section;

providing an established flow of said preheated vaporous sulfur containing gas in said supply conduit before said vaporous sulfur containing gas is introduced into said reaction zone by passing said gas at a velocity of at least 50 feet per second, through a supply conduit having a diameter at its downstream end no greater than the diameter of the entrance portion of said reaction zone and the downstream end portion of said conduit over a length equal to at least five times the diameter of its downstream end having a straight axis being coaxial with the reaction zone and being substantially nondivergent in the direction of flow of the vaporous sulfur containing;

directing inert particulate refractory material through a venturi nozzle upon the inside surfaces of both the reaction zone and the vaporous sulfur containing gas supply conduit that are adjacent to said inlet for the titanium tetrachloride, said nozzle being provided with a movable coaxial conical member spacially mounted downstream from the mouth of the venturi and adapted to deflect the particulate material outwardly; and reacting said titanium tetrachloride and said vaporous sulfur containing, gas in said reaction zone to produce titanium disulfide, and recovering said titanium disulfide.

* * * * *